United States Patent
Labbé

(10) Patent No.: US 6,837,286 B2
(45) Date of Patent: Jan. 4, 2005

(54) REMOVABLE DEVICE OF TRACTION ADAPTED FOR ANY MOTORIZED VEHICLES

(76) Inventor: Guy Labbé, 5, rue Chantovent, Beauport (CA), G1C 7B8

( * ) Notice: Subject to any disclaimer, the term of this patent is extended or adjusted under 35 U.S.C. 154(b) by 0 days.

(21) Appl. No.: 10/245,917

(22) Filed: Sep. 19, 2002

(65) Prior Publication Data

US 2004/0055681 A1 Mar. 25, 2004

(51) Int. Cl.[7] .......................... B60C 11/00; B60C 27/00
(52) U.S. Cl. ................................... 152/225 C; 152/217
(58) Field of Search ................................ 152/170, 172, 152/185, 187, 208, 216, 217, 223, 225 R, 225 CI, 232, 233

(56) References Cited

U.S. PATENT DOCUMENTS

| | | | | |
|---|---|---|---|---|
| 2,530,897 A | * | 11/1950 | Miller | 152/225 C |
| 2,582,193 A | * | 1/1952 | Dowdell et al. | 152/217 |
| 3,047,037 A | * | 7/1962 | Frederick | 152/228 |
| 3,109,475 A | * | 11/1963 | Whitman | 152/225 R |
| 3,735,789 A | * | 5/1973 | Landerer et al. | 152/217 |
| 3,878,988 A | * | 4/1975 | Blais | 238/14 |
| 4,155,391 A | * | 5/1979 | Dieck | 152/225 C |
| 4,281,791 A | * | 8/1981 | Schaaf et al. | 238/14 |
| 5,569,340 A | * | 10/1996 | Ulrich | 152/225 C |
| 5,899,380 A | * | 5/1999 | Beaulieu | 238/14 |
| 2002/0066509 A1 | * | 6/2002 | Labbe | |

* cited by examiner

Primary Examiner—Russell D. Stormer
Assistant Examiner—Jason R. Bellinger

(57) ABSTRACT

A removable device for any motor vehicle of which is capable of increasing traction when the drive wheels are trapped in snow, ice or mud.

The removable traction device includes a pair of chains being interconnected over the tread surface of a tire and attached to a pair of transversely extending structural bar members on each side of the tire, of which each structural bar member includes a plate member having raised studs on a surface for firmly gripping the rubber wall of tire.

Each plate member having threaded rods formed on a surface is connected to a structural part member having holes for receiving therethrough each threaded rod being connected thereby nuts for adjusting and securing a bolt in the width direction of the tire, the bolt passing through a plurality of inverted U-shaped brackets formed on the structural part member and connected by washers and a nut at the opposite lower end of each bar member and to a moving part member, of which a curved metal bar is adapted to be inserted into an opening of the moving part member for tightening and firmly gripping the rubber walls of the tire with the plurality of raised studs formed on each plate member.

1 Claim, 4 Drawing Sheets

REMOVABLE DEVICE OF TRACTION ADAPTED FOR ANY MOTORIZED VEHICLES

BACKGROUND OF THE INVENTION

1) Field of the Invention

The present invention relates to a removable device for any motor vehicle of which is capable of increasing traction when the drive wheels are trapped in snow, ice or mud.

2) Description of the Related Art

A search of prior art records has unveiled the following U.S. patents:
1. U.S. Pat. No. 3,878,988 issued in 1975 to Blais;
2. U.S. Pat. No. 5,899,380 issued in 1999 to Beaulieu; and
3. U.S. Pat. No. 4,281,791 issued in 1981 to Schaaf.

As can be seen, the patents to Blais, Beaulieu and Schaaf are probably the most relevant.

As is known, the traction aids are used for releasing a car when trapped in snow or ice. In use, the traction aid is placed in front of the tire in the forward acceleration mode and at the rear of the tire for rearward acceleration. When the car is accelerating, the wheels rotate at a high speed.

It is by the rotational force of the wheels that the traction aid is swept under the tire. One problem which is often encountered with the conventional traction aids is that it is difficult to control their positioning under the tire.

Indeed, when the wheels are rotating at a high speed, the latter tends to completely slide out and hit a part of the car, such as the muffler, the exhaust pipe or the tail pipe and thus severely damaging the same.

To overcome the above-mentioned problem, the applicant has developped a removable device of traction adapted for any motor vehicle of which is capable of increasing traction when the drive wheels are trapped in snow, ice or mud.

SUMMARY OF THE INVENTION

The gist of the invention is therefore to provide a removable device for any motor vehicle of increasing traction when the drive wheels are trapped in snow, ice, or mud.

The proposed system shows a removable traction device including a pair of chains being interconnected over the tread surface of a tire and attached to a pair of transversely extending structural bar members on each side of the tire, the lower end of each structural bar member is engaged and welded to a first plate member having a plurality of raised studs on a surface for firmly gripping the rubber wall of tire; the opposite lower end of each structural bar member is connected to a structural part member, which includes holes for receiving therethrough a plurality of threaded rods formed on a surface of a second plate member having a plurality of raised studs on a surface opposite the threaded rods, with a plurality of nuts for adjusting and securing a bolt in the width direction of the tire, the bolt passing through a plurality of inverted U-shaped brackets formed on the structural part member and connected by washers and a nut at the opposite lower end of each structural bar member and to a moving part member, of which a curved metal bar is adapted to be inserted into an opening of the moving part member for tightening and firmly gripping the rubber walls of the tire with the plurality of raised studs on each of the first and second plate members.

BRIEF DESCRIPTION OF THE SEVERAL VIEWS OF THE DRAWING(S)

DETAILED DESCRIPTION OF THE INVENTION

Figure 1:
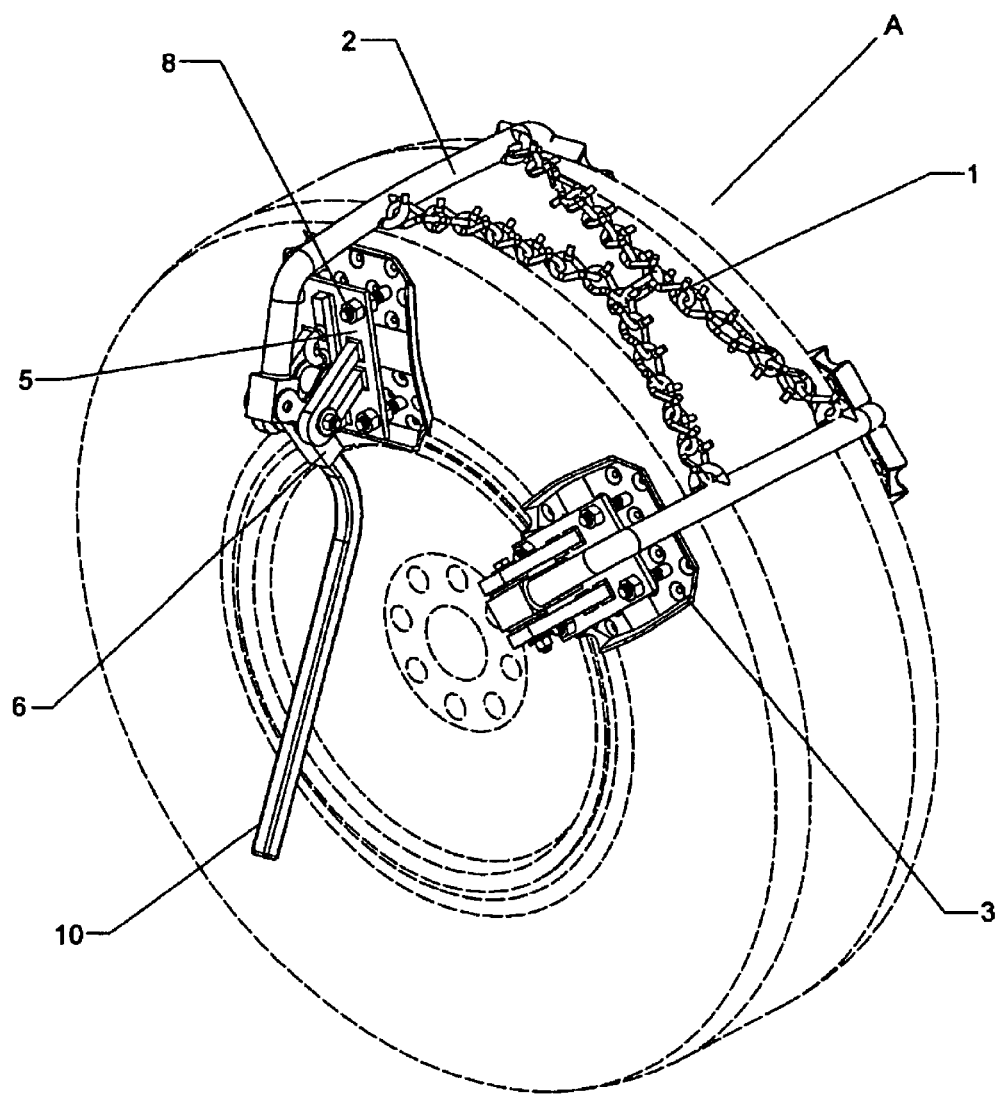
FIG. 1 is a perspective view of removable traction device and attached tire, and viewing a curved metal bar in position to tighten and grip each plate member having raised studs thereon the rubber wall of tire.

Referring to the drawings in more detail, it may be seen that the removable traction device (A) of the present invention is adapted for any motor vehicle of which is capable of increasing traction when the drive wheels are trapped in snow, ice, or mud.

Figure 2:
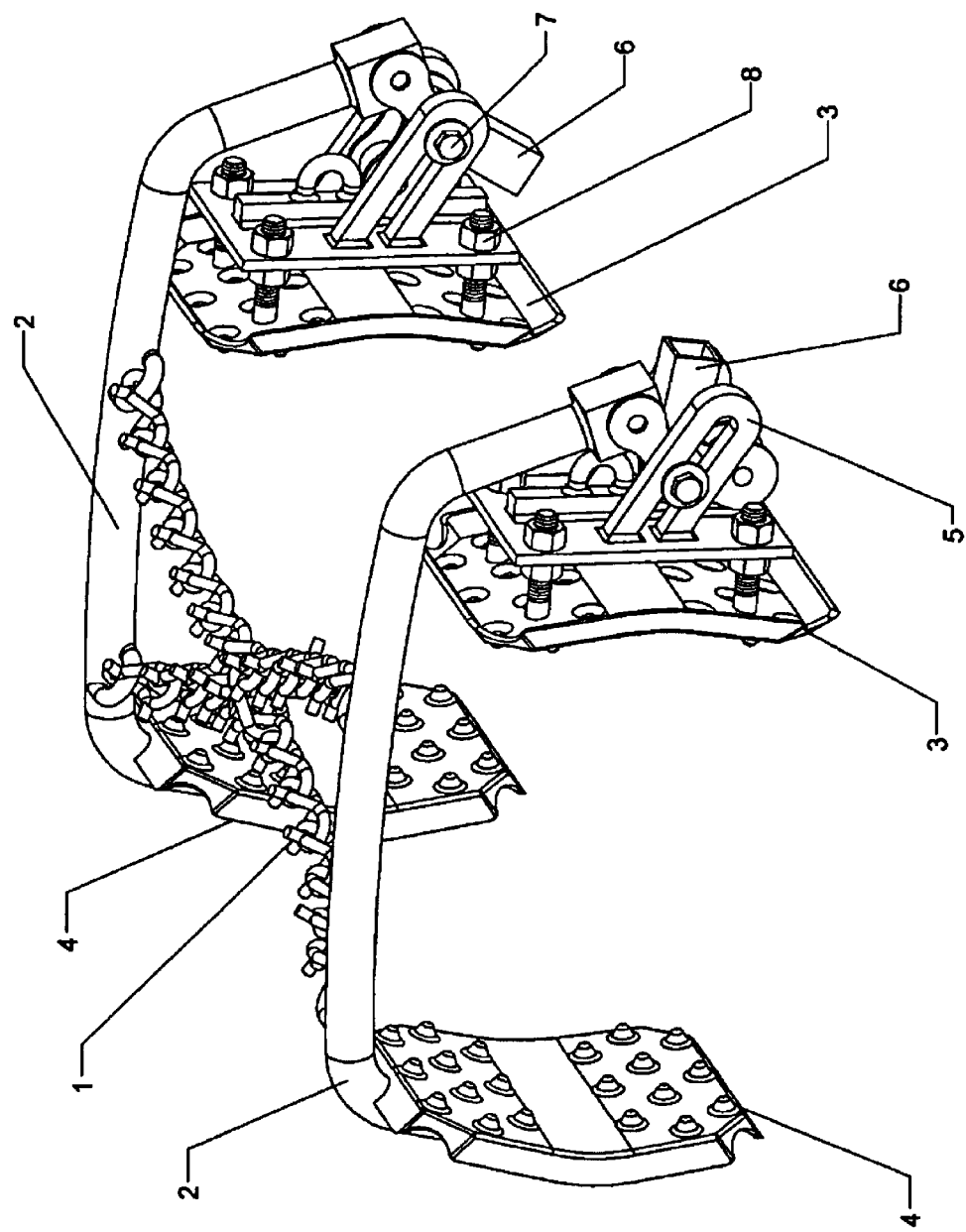
FIG. 2 is a perspective front view of the removable traction device.
Figure 3:
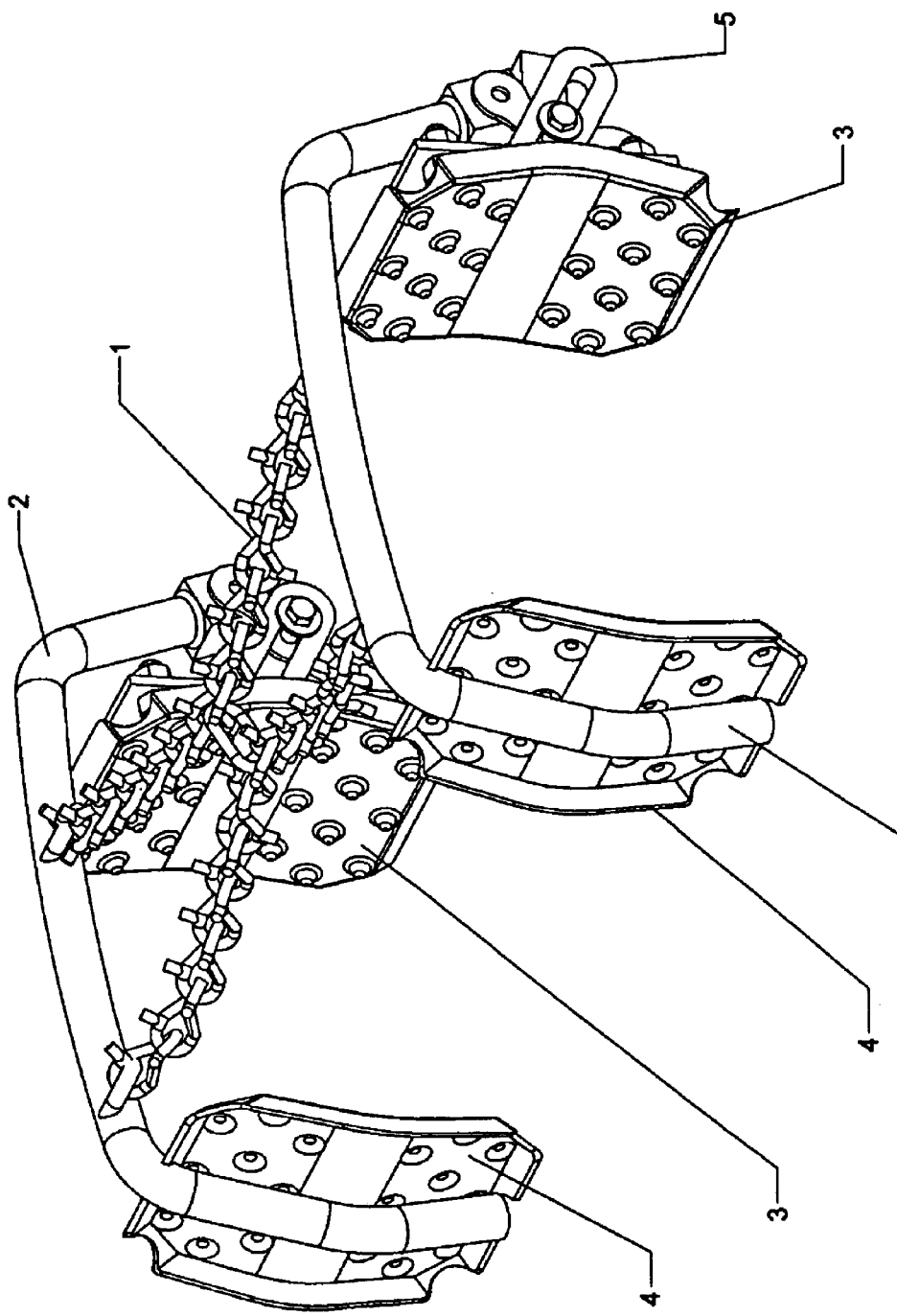
FIG. 3 is a perspective rear view thereof.
Figure 4:
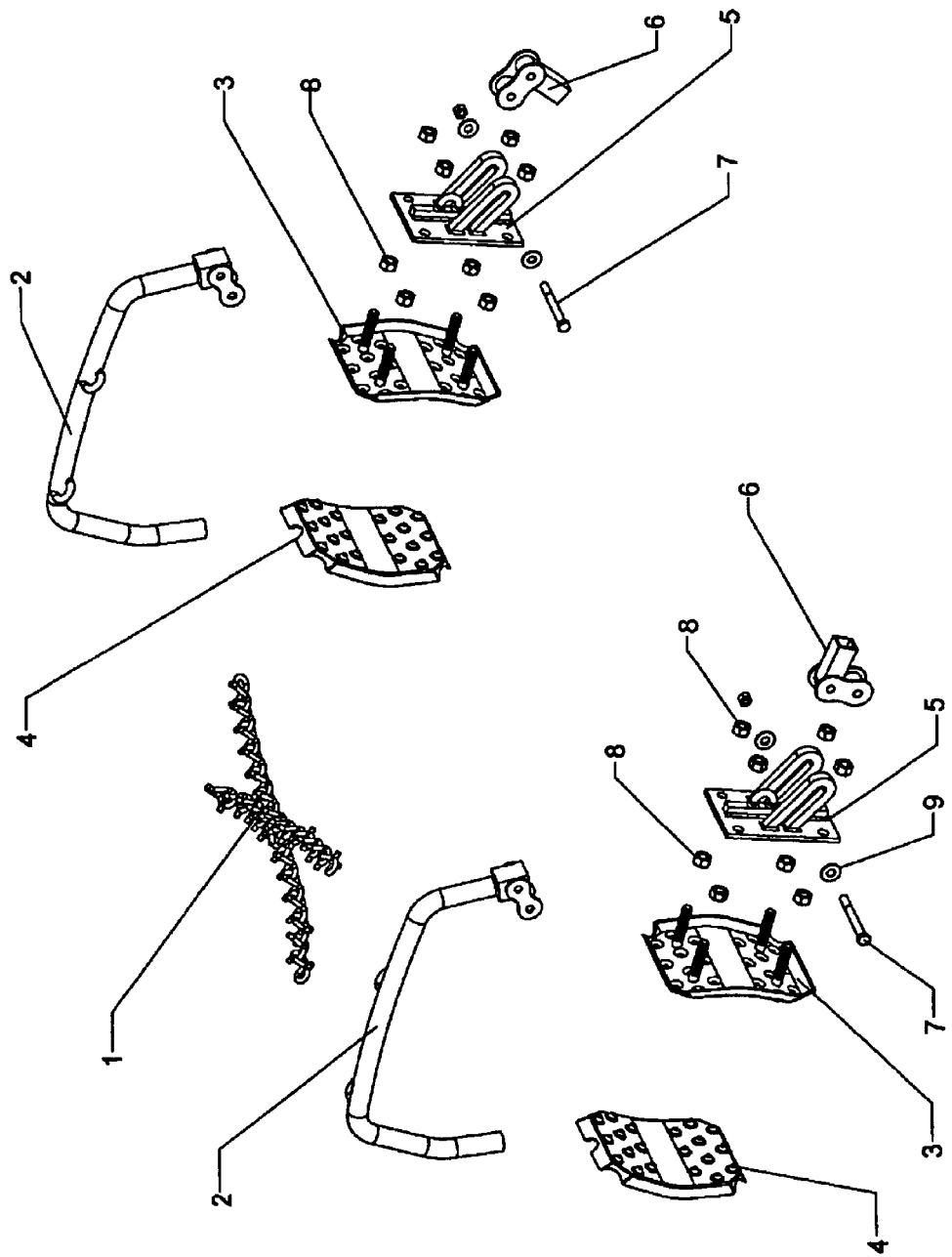
FIG. 4 is an exploded view showing the components in position for assembly.

As shown in FIGS. 1 to 4, a removable traction device (A) including a pair of chains (1) being interconnected over the tread surface of a tire as indicated in the dotted line and attached to a pair of transversely extending structural bar members (2) on each side of the tire, the lower end of each structural bar member (2) is engaged and welded to a first plate member (4) having a plurality of raised studs on a surface for firmly gripping the rubber wall of tire; the opposite lower end of each structural bar member (2) is connected to a structural part member (5), which includes holes for receiving therethrough a plurality of threaded rods formed on a surface of a second plate member (3) having a plurality of raised studs on a surface opposite the threaded rods, with a plurality of nuts (8) for adjusting and securing a bolt (7) in the width direction of the tire, the bolt passing through a plurality of inverted U-shaped brackets formed on the structural part member (5) and connected by washers (9) and a nut at the opposite lower end of each structural bar member (2) and to moving part member (6), of which a curved metal bar (10) is adapted to be inserted into an opening of the moving part member (6) for tightening and firmly gripping the rubber walls of the tire with the plurality of raised studs on each of the first and second plate members.

Although only a single embodiment of the present invention has been described and illustrated, the present invention is not limited to the features of this embodiment, but includes all variations and modifications within the scope of claims.

The embodiments of the invention for which an exclusive property or privilege is claimed, are defined as follows:

1. A removable traction device including a pair of chains being interconnected over the tread surface of a tire and attached to a pair of transversely extending structural bar members on each side of the tire, the lower end of each structural bar member is engaged and welded to a first plate member having a plurality of raised studs on a surface for firmly gripping the rubber wall of the tire; the opposite lower end of each structural bar member is connected to a structural part member, which includes holes for receiving therethrough a plurality of threaded rods formed on a surface of a second plate member having a plurality of raised studs on a surface opposite the threaded rods, with a plurality of nuts for adjusting and securing a bolt in the width direction of the tire, the bolt passing through a plurality of inverted U-shaped brackets formed on the structural part member and connected by washers and a nut at the opposite lower end of each structural bar member and to a moving part member, of which a curved metal bar is adapted to be inserted into an opening of the moving part member for tightening and firmly gripping the rubber walls of the tire with the plurality of raised studs on each of the first and second plate members.

* * * * *